United States Patent [19]

Greenwald et al.

[11] Patent Number: 4,874,540

[45] Date of Patent: Oct. 17, 1989

[54] GRAFT COPOLYMERS OF A POLYETHER MOIETY ON A POLYCARBOXYLATE BACKBONE

[75] Inventors: Richard B. Greenwald, Eagan; Chung-Tsing Liu, Bloomington; James A. McDonell, St. Paul, all of Minn.

[73] Assignee: Ecolab Inc., St. Paul, Minn.

[21] Appl. No.: 92,686

[22] Filed: Sep. 3, 1987

Related U.S. Application Data

[63] Continuation-in-part of Ser. No. 887,891, Jul. 18, 1986, abandoned.

[51] Int. Cl.$^4$ .............................................. C11D 3/37
[52] U.S. Cl. .......................... 252/174.24; 252/174.23; 252/548; 252/DIG. 2
[58] Field of Search ...................... 252/174.24, 174.23, 252/548, DIG. 2

[56] References Cited

U.S. PATENT DOCUMENTS

| | | | |
|---|---|---|---|
| 2,746,868 | 5/1956 | Cross et al. | 99/123 |
| 2,873,263 | 2/1959 | Lal | 260/45.4 |
| 2,875,097 | 2/1959 | Pritchard | 117/138.5 |
| 3,308,067 | 3/1967 | Diehl | 252/161 |
| 3,370,050 | 2/1968 | Seiner | 260/80.81 |
| 3,383,351 | 5/1968 | Stamberger | 260/33.2 |
| 3,418,354 | 12/1968 | Wheeler | 260/448.2 |
| 3,531,409 | 9/1970 | Seffens et al. | 252/8.55 |
| 3,546,321 | 12/1970 | Jabloner et al. | 260/874 |
| 3,576,760 | 4/1971 | Gould et al. | 252/403 |
| 3,577,516 | 5/1971 | Gould et al. | 424/46 |
| 3,650,970 | 3/1972 | Pratt et al. | 252/181 |
| 3,880,765 | 4/1975 | Watson | 252/8.55 |
| 3,881,026 | 4/1975 | Shepherd et al. | 426/223 |
| 3,886,125 | 5/1975 | Chromecek | 260/78.3 |
| 3,899,436 | 8/1975 | Copeland et al. | 252/99 |
| 3,966,902 | 6/1976 | Chromecek | 424/59 |
| 3,985,929 | 10/1976 | von Bonin et al. | 428/290 |
| 3,993,553 | 11/1976 | Assarsson et al. | 204/159 |
| 4,122,056 | 10/1978 | Ramlow et al. | 260/29.6 |
| 4,152,273 | 5/1979 | Welland | 252/8.8 |
| 4,207,227 | 6/1980 | von Bonin | 260/40 |
| 4,312,889 | 1/1982 | Meisheimer | 426/86 |
| 4,453,979 | 6/1984 | DeMasi et al. | 106/188 |
| 4,483,848 | 11/1984 | Cox et al. | 424/49 |
| 4,528,334 | 7/1985 | Knopf et al. | 525/404 |

FOREIGN PATENT DOCUMENTS 922457 4/1963 United Kingdom .

OTHER PUBLICATIONS

*Evaluation of Disinfectants in the Domestic Environment under In Use Conditions*, by Elizabeth Scott, Sterling Health Research Unit, Sterling Health, Millbank House, Surbiton, revised 7/15/83, accepted 9/21/83.
*An Investigation of Microbial Contamination in the Home*, by Elizabeth Scott, Sally F. Bloomfield, C. G. Barlow accepted 6/15/82.
*Bacterial Survey of Hygiene in the Home*, by Elizabeth Scott, Sally F. Bloomfield and C. G. Barlow.
"An Improved Method for Evaluating Detergent Builders for Water Hardness Control", J. A. McDonell and A. Liu, *Journal of American Oil Chemical Society*, vol. 64, No. 5, (May, 1987).
Derwent Abstracts, AN 68-11390Q/00, "Detergent Emulsion", Great Britain Patent 1126479.
Derwent Abstracts, AN 76-90740X/49, "Surfactant Based Washing Composition", German Patent DE 2520272-A, 11/25/76.

*Primary Examiner*—Paul Lieberman
*Assistant Examiner*—Christine A. Skane
*Attorney, Agent, or Firm*—Merchant, Gould, Smith, Edell, Welter & Schmidt

[57] ABSTRACT

A composition having a high chelation value may be made by blending about 50 to 80 wt-% of a polyether such as polyethylene glycol, about 20 to 50 wt-% of a polycarboxylate such as polyacrylate moiety or an acrylate monomer, and about 0.1 to 0.5 mole-%, based upon the polyacrylate moiety or the monomer, of an organic peroxy catalyst such as t-butyl perbenzoate at a temperature below about 110° C. but sufficient to liquefy the blend and cause grafting of a polyether on the polycarboxylate.

31 Claims, 2 Drawing Sheets

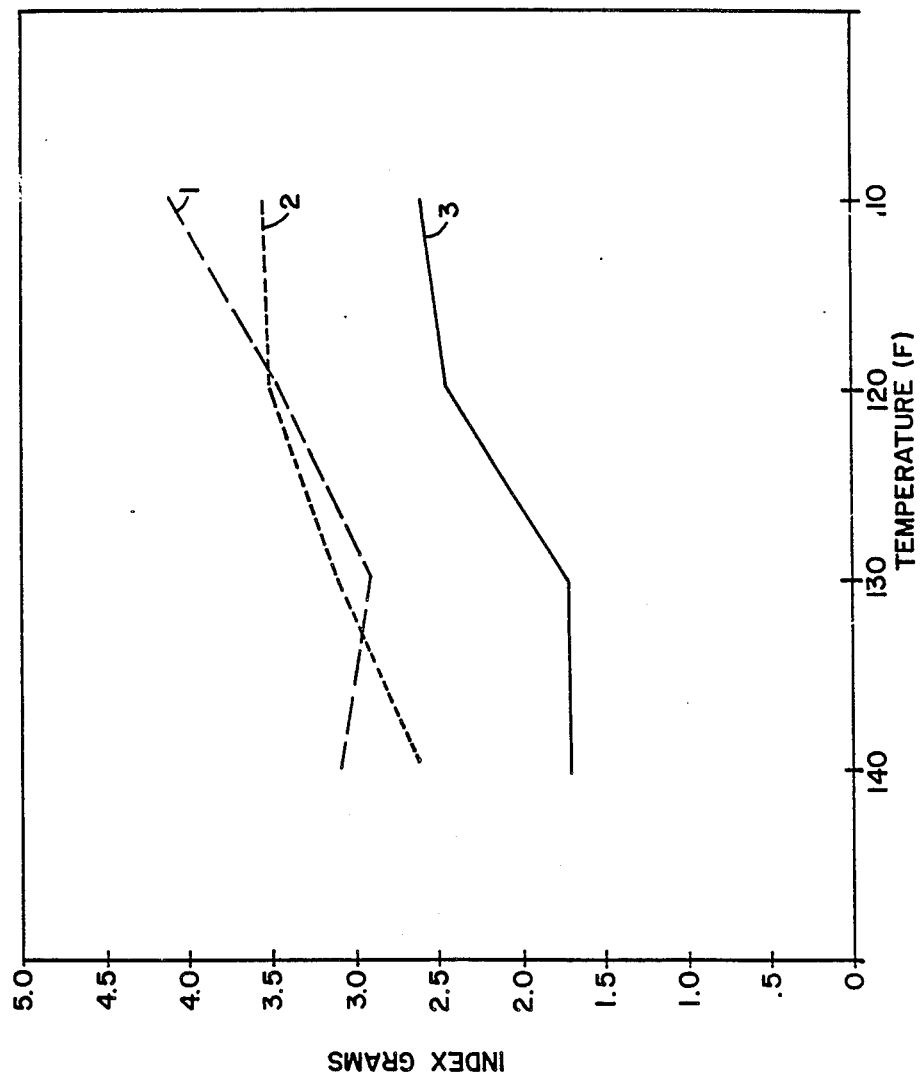

GRAFT COPOLYMERS OF A POLYETHER MOIETY ON A POLYCARBOXYLATE BACKBONE

This application is a continuation-in-part of U.S. Ser. No. 887,891, filed July 18, 1986 abandoned.

FIELD OF THE INVENTION

The invention relates to polymeric agents for water treatment, chelation or threshold effects and methods of their manufacture. More specifically, this invention relates to graft copolymers that can be used generally in water treatment, can be used as threshold agents or can be used as chelating agents with high chelation values at low concentration and applicability in a variety of water treatment applications. The invention relates to a novel form of a graft copolymer having a novel structure of polyether units grafted onto a polycarboxylate backbone. The unique structure results in a composition having high chelation value that is obtained from the method of preparation involving a controlled grafting of polyether units on the polycarboxylate backbone.

BACKGROUND OF THE INVENTION

Service water (i.e. water produced by local water utilities) that is employed for personal, commercial and industrial use typically contains hard water components such as di- and trivalent cations including calcium, magnesium, iron, manganese, copper, etc. The hardness components in service water can have a negative impact on many household, commercial and industrial products and processes using service water. The appearance or utility of swimming pools, lawn care chemicals, laundry compositions, warewashing components, food service preparation, boiler operations, and others can have a negative impact caused by the presence of hardness components in water. In such products and processes, the hardness cations can cause film and scale formation, can interact with and reduce the cleaning capacity of components of cleaning compositions, and can form objectionable precipitates from process by-products. In order to reduce or eliminate such interference caused by hardness components in industrial products and processes, sequestering (chelating) or threshold agents can be used to reduce the interference by adding such agents to the service water separately or as a component of a treatment composition. Sequestering or chelating agents commonly react with the hardness components and prevent potential interaction between the hardness ion and the processes or components used in the processes.

Threshold agents are typically added at very low concentrations, compared to stoichiometric chelating amounts, for the purpose of substantially delaying the formation of hardness precipitates. Threshold agents are typically not used in stoichiometric amounts and typically are compositions that inhibit or poison crystal growth or formation.

Commonly water treatment or chelating agents fall within well known classes of compounds including condensed phosphates, organic phosphonates, organic polycarboxylates, and organic graft copolymers. Condensed phosphates such as alkali metal tripolyphosphates, alkali metal hexametaphosphates, alkali metal pyrophosphates, and others are powerful hardness sequestrants, however due to adverse ecological effects created by the disposal of these phosphates in waterways, non-phosphate chelating agents have been developed and used (see, for example, U.S. Pat. No. 3,308,067, which discloses a number of polycarboxylates useful as chelating agents). Phosphonate chelating agents are equally useful but suffer the same drawbacks. The nonphosphate chelating agents including polycarboxylates and other graft copolymers represent relatively effective replacements for phosphates.

A known class of graft copolymers is disclosed in Knopf et al, U.S. Pat. No. 4,528,334, assigned to Union Carbide Corporation. A review of Knopf as a whole including the preferred reaction temperatures and the Examples shows that the disclosure in Knopf is directed to a specific type of graft copolymer. A primary example of this graft copolymer is shown in Example I of the patent. The Example describes a graft polymerization reaction product of polyalkylene oxide composition and acrylic acid at 150° C. in the presence of an initiating catalyst. Our duplication of the Knopf product indicates that according to the disclosures in the specification and Examples of Knopf, the product is a water insoluble solid or semi-solid. From our characterization work of the polymer product, we have concluded that the insolubility of the semi-solid or solid reaction product relates to its molecular conformation which is a "ladder" polymer.

By a ladder polymer we mean a polymer wherein each ladder side rail, which would correspond to the vertical aspect of the ladder, comprises a polycarboxylate, preferably polyacrylate polymer component and the horizontal or tread portion of the ladder would comprise a polyalkylene oxide. We believe that the insolubility of the Knopf polymer reaction product results from the formation of "side rails" at both ends of the polyacrylate "treads" which reduces the availability of carboxylate moieties to the bulk aqueous phase.

The polymer conformation that we have found in the Knopf materials is a result of the reaction conditions disclosed in the patent and its Examples. Knopf indicates at column 4, lines 3–9 that preferred reaction temperatures range from about 130°–150° C. We have found that these reaction temperatures cause the nearly exclusive formation of the ladder type polymer configuration.

In addition a manufacturing technique in which the chelating agent can be readily manufactured in concentrated form, i.e. does not require the removal of solvent from the concentrated product, is desired. Accordingly, a substantial need exists for a highly effective phosphate-free chelating agent which is readily manufactured and available in a concentrated form.

SUMMARY OF THE INVENTION

We have found that the drawbacks in the "full ladder" polymer configuration of the prior art polycarboxylate graft copolymers can be solved by forming the reaction product in a "half-ladder" configuration wherein one side rail of the graft copolymer is not formed in the final polymer configuration. We have found that in order to prepare the half-ladder, water soluble polymer, that has substantially increased chelation value, the reaction temperature must be closely controlled and maintained below about 110° C. Preferably, the temperature is maintained between about ambient (25°–27° C.) and 100° C. With adequate temperature control a half-ladder graft copolymer is formed wherein the second "side rail" polycarboxylate component is not joined to the tread polyacrylate graft moieties on the first "half-ladder". We have found that the absence of the second rail frees a substantial proportion of carboxylic acid groups at the terminus of the polyalkylene oxide tread and these terminal carboxylate groups participate in aqueous solution to provide both water solubility and substantially improved chelating or sequestering capacity.

The half-ladder composition may be formed by blending about 50 to 80 wt-% of a polyether, about 20 to 50 wt-% of a carboxylate monomer or a preformed polycarboxylate polymer moiety, about 0.1 to 0.5 wt-% of a polymerization initiator and optionally about 0.1 to 5 wt-% of a chain transfer agent, at an elevated temperature below about 100°–110° C. sufficient to liquefy the blend and to cause the half-ladder graft formation. Once cooled, the composition can take the form of a liquid, semi-solid or solid depending on the molecular weight of the polyether used and the molecular weight or polymerization extent of the preformed polycarboxylate moiety or the graft polycarboxylate.

While not intending to be limited by theoretical considerations, we believe that the increase in chelation value of the polycarboxylate graft half-ladder conformation formed in accordance with this invention is due to the grafting of about 1 to 10 polyalkylene oxide moieties onto a polycarboxylate rail backbone terminating in a group. We have also found that the compounds of the invention have chelation values that exceed similar prior art graft polymers. Such increased chelation properties enable the skilled artisan to obtain significant chelation values at low concentration levels. For the purpose of this application a chelating agent is a chemical agent that can react with a metal ion through two or more coordinate covalent bonds to form at least one heterocyclic ring. This reaction removes the metal ion from the solution sufficiently to prevent interaction with other chemicals or processes. A chelation value relates the amount of chelation agent to the amount of metal ion that can be bound. We have found that the agents of this invention are significantly better than the agents of Knopf (see Table 1).

We have also found that the compositions of the invention when used in combination with other water conditioning agents can display a unique synergy and surprisingly increased water treatment properties. Lastly we have found that the compounds of the invention are biodegradable in typical disposal environments.

As utilized herein, "chelation agent" refers to compounds capable of interacting with typically di- or trivalent metal hardness component ions via coordinate covalent bonds so as to prevent metal ions from being available in aqueous solution to interact with processes and products.

Further, "blend" when used as a noun refers to a mixture of components including polyethers, carboxylate monomers, polycarboxylate moieties, polymerization initiators, chain transfer agents, and other reactants, reaction products. Graft copolymer refers to polymeric substances composed of at least two polymeric moieties joined by a covalent bond.

In this application including the claims, "wt-%" is typically based on the total product blend, while "mole-%" is based only on the polymer unless otherwise indicated.

DETAILED DESCRIPTION OF THE INVENTION

Figure 1:
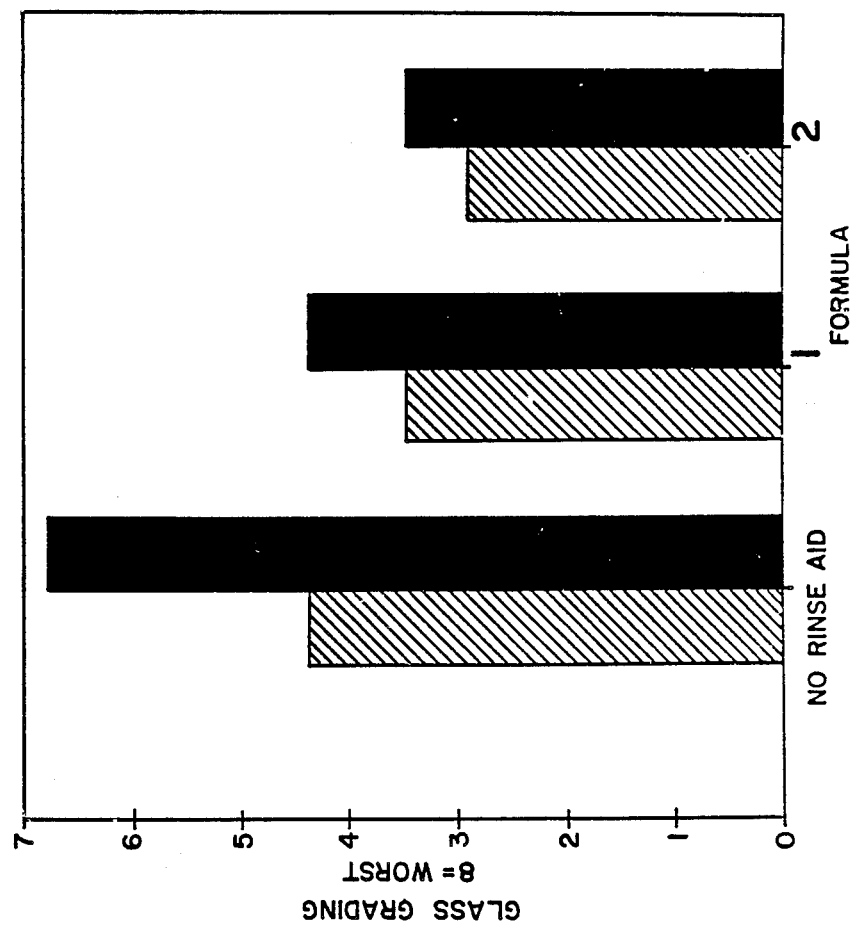

We have discovered that a significantly improved graft copolymer can be made by forming polyalkylene oxide (or polyether) moieties on a single polycarboxylate (polyacrylate) backbone through reaction at a controlled temperature. The resulting composition has high chelation value and can be in the form of a solid, semi-solid or liquid depending on the molecular weight of the polyalkylene oxide moiety or the polycarboxylate backbone used.

Typically, the composition is formed by blending appropriate amounts of the polyether with either an alpha, beta unsaturated carboxylic acid monomer or other unsaturated carboxylate monomer or a preformed polycarboxylate polymer moiety, a polymerization initiator and a chain transfer agent (transfer agent not required for preformed polymer) at a temperature of below about 110° C. sufficient to liquefy the blend and to promote the graft reaction forming the polyalkylene oxide moieties on the polycarboxylate.

A preferred method of manufacturing the composition comprises the steps of heating the polyether to a temperature sufficient to liquefy the composition and initiating grafting of the polyether with a preformed polycarboxylate moiety or a carboxylate monomer (preferably at about 80° to 100° C.), adding the monomer or the polycarboxylate moiety, the initiator and the chain transfer agent to the heated liquefied polymer over a period of about 1 to 5 hours, maintaining the blend at sufficient temperature to promote complete grafting of the polyether and polycarboxylate without formation of a second polycarboxylate side rail, and cooling the blend. Optionally, the blend may be oxidized with 1 to 5 wt-% of an oxidant such as peracetic acid, chlorine, persulfate, hydrogen peroxide, and the like to react with and destroy the remaining chain transfer agent.

While the composition of the resultant blend may vary dependent upon the reactants and reaction conditions employed, we have found that the blend will typically contain about 30 to 60 wt-% graft copolymer, about 0 to 5 wt-% ungrafted polycarboxylate homopolymer, and about 40 to 70 wt-% ungrafted polyether and is apparently substantially free of the full "ladder graft copolymer". The blend may be usefully employed as a chelating agent without further modification, or the graft copolymer may be separated from the ungrafted polycarboxylate and/or polyether by placing the blend in a solvent which can dissolve the ungrafted polycarboxylate and/or ungrafted polyether but not the graft copolymer, and then decanting the polycarboxylate and/or polyether containing solvent. Suitable solvents include benzene, toluene, etc. Others can be found by known experimental methods. The composition can also be dialyzed to remove small molecular weight impurity.

Polyethers are a well-known group of polymers in which the repeating unit contains a carbon-oxygen bond. The blend can contain about 50 to 90 wt-%, preferably about 70 to 80 wt-% of a polyether. A nonlimiting list of polyethers which may be employed include polyalkylene glycol homopolymers, block and random copolymers of ethylene and propylene oxide, and alkyl alcohol alkoxylates. For reasons of low cost, ease of availability, excellent water solubility of the resultant graft copolymer and ability to produce both liquid and solid graft copolymers, the preferred polyethers are the polyethylene glycols having a molecular weight of about 200–10,000. Suitable commercially available polyethylene glycols are available from Union Carbide under the trade name CARBOWAX.

The blend can contain about 10 to 50 wt-%, preferably about 20 to 30 wt-% polycarboxylate. A nonlimiting list of ethylenically unsaturated carboxylic acid monomers which may be polymerized to form a polycarboxylate useful in the present invention include acrylic acid, methacrylic acid, itaconic acid, maleic acid, and mixtures thereof. For reasons of low cost, ease of availability, excellent water solubility of the resultant graft copolymer and high chelation value of the resultant graft copolymer, the preferred polycarboxylates are those of 5,000 to 15,000 molecular weight. Most preferred are the 5,000 to 8,000 molecular weight polycarboxylates.

In the instance that the composition is prepared from a preformed polycarboxylate moiety, the polycarboxylate moiety is typically made from monomers the same as used in forming preformed polymeric moieties from the associated monomer. The preferred preformed polycarboxylate moieties have a molecular weight in the range of 5,000 to 15,000 and preferably 5,000 to 8,000. In the manufacture of the graft copolymers from preformed polymer moieties, identical reaction conditions are used and appear to form products that are identical in water solubility and chelation value.

The blend can contain about 0.1 to 0.5 mole-%, preferably about 0.3 to 0.4 mole-%, of grafting catalyst, based upon the moles of monomer or polycarboxylate grafting moieties. Any of the well-known initiation catalysts can be used, preferably the organic peroxides can be employed in the present invention as the catalyst, including, but not limited to, cumene hydroperoxide, p-methyl hydroperoxide, diisopropylbenzene monohydroperoxide, dicumene peroxide, benzoyl peroxide, diacetyl peroxide, t-butyl perbenzoate, and the like.

We have discovered that the use of a catalyst is necessary to obtain a grafting of the polycarboxylate to the polyether. Attempts to make graft copolymers without the use of a catalyst result in substantially no grafting and no detectable increase in chelation value over the original polycarboxylate and polyether.

In the manufacture of the half-ladder graft copolymers of this invention, we have discovered that the manufacturing and the post-manufacturing processing of the half-ladder graft copolymers of this invention can be substantially improved by the addition to the reaction mixture of an effective amount of a $C_{1-6}$ mono, di or trihydroxy alcohol composition. Specific examples of such compositions are ethylene glycol, propylene glycol, 1,4-butane diol, glycerol, sorbitol, low molecular weight polyalkylene oxide diols or triols, and others. We have found that these compositions when interacting in the reaction mixture and in post-reaction processing, reduce viscosity, improve elevated temperature processing characteristics, and handling properties. A preferred alcohol processing composition for use in this invention comprises propylene glycol.

The half-ladder graft copolymers of the invention can be used in any water treatment application where the chelation or sequestration of hardness cations is important. Such chelators can be useful in treatment of boiler water, industrial process waters, diluted effluents, aqueous process streams, institutional or industrial cleaning liquors, and other areas where hardness cations including calcium, magnesium, manganese, iron, etc. can interfere with the chemistry or form unwanted deposits on surfaces of the location.

A preferred application of the half-ladder graft copolymers of the invention is in a rinse aid useful in consumer, institutional and industrial flatware and dishware washing in automatic machines. When the liquid, semisolid or solid compositions are introduced in a controlled manner into the rinse cycle of such machines, the compositions promote a sheeting action that aids in the removal of rinse water from the surface of the flatware and dishware, creating cleaned dishes having no filming and spotting upon drying. Further, the rinse agents effectively treat the rinse water to substantially reduce the effect of hardness cations in forming deposits on the surface of the ware. A typical solid rinse aid composition can comprise about 30 to 90 wt-%, preferably about 50 to 80 wt-%, of the half-ladder polymer product in solid form, about 5 to 60 wt-%, preferably about 10 to 30 wt-% surfactant, about 5 to 40 wt-%, preferably about 10 to 30 wt-% of a composition to decrease water solubility of the rinse aid composition, and about 0 to 10 wt-%, preferably about 1 to 5 wt-% of a defoamer, all based upon the total rinse aid composition. While these rinse aid components may be blended in any convenient manner, a preferred method of making the rinse aid comprises the steps of heating the blend to a temperature sufficient to form a liquid thereof; adding the water solubility reducing agent, the defoamer, and the surfactant to the liquefied blend to form the rinse aid; mixing the rinse aid to ensure a homogeneous composition; and cooling the composition to room temperature to solidify the rinse aid.

Surfactants are a well-known group of compounds capable of reducing surface tension. The rinse aid composition can contain about 5 to 60 wt-%, preferably about 10 to 30 wt-% surfactant. While substantially any of the well-known surfactants may be usefully employed in the rinse aid, for reasons of creating effective surface tension reduction under low foam conditions, the low foaming nonionic surfactants such as polyoxyalkylene oxide block copolymers, alkoxylated alkyl phenols, alkoxylated aliphatic alcohols, lecithin, lecithin derivatives, anionics, and the like are preferred.

A solubility reducing agent may be employed in the rinse aid composition to adjust the release rate of the composition and prevent it from being utilized too rapidly. Typically, a sufficient amount of the water solubility reducing agent is employed to create a rinse aid composition which lasts as long as possible while releasing a sufficient spot-preventing amount of the rinse aid during each rinse cycle. The rinse aid composition can contain about 5 to 40 wt-%, preferably about 10 to 30 wt-% of the water solubility reducing agent. A nonlimiting list of water solubility reducing agents which may be employed in the rinse aid includes microcrystalline waxes, ethylene-acrylic copolymers, alkyl alkanol amides, and the like. Due to its compatibility with the other rinse aid components, its lack of interference with the rinsing process and its ease of processing, the most preferred water solubility reducing agent is stearic monoethanolamide.

Defoamers are a well-known group of compounds which, when dissolved in solution, tend to reduce the amount of foam generated by the solution. The rinse aid composition can contain about 0 to 10 wt-%, preferably about 1 to 5 wt-% of a defoamer. A nonlimiting list of defoamers which may be employed in the present invention includes phosphate esters, natural or synthetic waxes, silicones, fatty acids, hydrophobic silica, hydrocarbons, and the like. For reasons of effectiveness in defoaming proteinaceous solutions and ease of handling the preferred defoamers are the phosphate esters.

EXAMPLES I–V

Acrylic Acid Monomer Graft Reaction With Catalyst

Example I

Into a 2 liter reaction vessel equipped with a thermometer, nitrogen purge, heating mantle, reflux condenser, vacuum pump, three separate dropping funnels, and an overhead stirrer was placed 390.88 grams of a 200 average molecular weight polyethylene oxide polymer. The polymer was heated to 90° under nitrogen and into the heated polymer was added over a 3-hour period 92.72 grams (1.29 moles) of glacial acrylic acid, 5.44 grams (0.05 moles) of mercaptopropionic acid, and 1.0 grams (0.005 moles) of tertiary butyl perbenzoate. After the acrylic acid, mercaptopropionic acid and tertiary butyl perbenzoate additions were completed, 9.96 grams (0.102 moles) of 35 wt-% aqueous hydrogen peroxide was added to the reaction product over a 45-minute period. The product was clear, golden in appearance, and was liquid after cooling.

Example II

Example I was repeated except that the following reactants were substituted for those used in Example I: 400 grams (0.667 moles) of a 600 molecular weight polyethylene oxide polymer, 84.97 grams (1.18 moles) of acrylic acid, 4.99 grams (0.047 moles) of mercaptopropionic acid, 0.92 grams (0.0047 moles) of tertiary butyl perbenzoate, and 9.13 grams (0.0939 moles) of a 35 wt-% aqueous hydrogen peroxide solution. The product was an almost colorless viscous liquid.

Example III

Example I was repeated exactly except with the following reactants substituted for the reactants of Example I: 400 grams (0.40 moles) of a 1,000 molecular weight polyethylene oxide polymer, 84.97 grams (1.18 moles) of acrylic acid, 4.99 grams (0.047 moles) of mercaptopropionic acid, 0.92 grams (0.0047 moles) of tertiary butyl perbenzoate, and 9.13 grams (0.0939 moles) of a 35 wt-% aqueous hydrogen peroxide solution. The product was a white, solid material upon cooling.

Example IV

Example I was repeated exactly except that the following reactants were substituted for the reactants of Example I: 1,200 grams (0.24 moles) of a 5,000 M.W. polyalkylene oxide polymer, 288 grams (4.0 moles) of acrylic acid, 16.9 grams (0.16 moles) of mercaptopropionic acid, 6.24 grams (0.32 moles) of tertiary butyl perbenzoate, and 31.0 grams (0.319 moles) of a 35 wt-% aqueous hydrogen peroxide solution. The product was a white, solid material.

Example V

Example I was repeated exactly except that the following reactants were substituted for the reactants of Example I: 2,400 grams (0.30 moles) of an 8,000 molecular weight polyethylene oxide polymer, 596 grams (8.28 moles) of acrylic acid, 33.8 grams (0.32 moles) of mercaptopropionic acid, and 6.24 grams (0.03 moles) of tertiary butyl perbenzoate. The mercaptopropionic acid and tertiary butyl perbenzoate were added in the form of 90 grams of a solution of the components in isopropyl alcohol. The product was a white/pale yellow solid material.

Example VI

Polymer Blend With No Catalyst

Into a 2 liter reaction vessel equipped with a thermometer, a nitrogen purge, a heating mantle, a reflux condenser, a vacuum pump, and an overhead stirrer was placed 400 grams of a 5,000 average molecular weight polyethylene glycol. The glycol was heated to 92° C. and sparged with nitrogen for 45 minutes. 100 g. of a 7,200 average molecular weight anhydrous polyacrylate was added to the glycol in a single addition. The blend of glycol and polyacrylate was then post reacted at a temperature of between 93° to 95° C. for 4.5 hours. The vacuum pump was activated at 2.25 hours into the post reaction to remove water vapor from the reaction vessel. After completion of the post reaction, the blend was allowed to cool to room temperature; forming an off-white solid.

Example VII

Preformed Polymer Grafted with Catalyst

Into a 1 liter reaction vessel equipped with a thermometer, a nitrogen purge, a heating mantle, a reflux condenser and an overhead stirrer was placed 400 grams of a 5,000 average molecular weight polyethylene glycol and 100 grams of a 7,200 average molecular weight polyacrylate. The composition was heated to 100° C. and sparged with nitrogen for 30 minutes. 2.06 grams of t-butyl perbenzoate was added to the composition over a 3-hour period at a rate of 0.15 gram every 15 minutes. The temperature of the composition was maintained between 98° and 105° C. during addition of the t-butyl perbenzoate. The composition was post-reacted under constant agitation at a temperature of 95°–110° C. for 1 hour. The blend was allowed to cool to room temperature, forming an off-white solid.

Method of Measuring Chelation Value

A chelation agent is dissolved in 1,000 milliliters of deionized water to form a solution having a concentration of 200 ppm active chelation agent. The pH of the solution is adjusted to substantially neutral by the addition of a dilute solution of sodium hydroxide. One gram of sodium carbonate is then added. A dilute solution of sodium hydroxide is added to the solution to adjust the pH to 10. The resultant solution is titrated with a 0.25N solution of the calcium acetate. Sufficient amounts of the dilute sodium hydroxide solution are continually added to the solution throughout the titration to maintain a pH of 10. A high intensity beam of light from an American Optical Model 551 is turned on and configured to shine through the solution at an angle perpendicular to the line of sight during the titration to aid in making a visual determination of when a precipitate begins to form in the solution. The results are reported as grams of calcium carbonate chelated per gram of chelating agent.

TABLE 1

| Material | Chelation Value (C.V.) C.V. (Gram CaCO₃/ gram of Product) |
|---|---|
| Example V (Grafted Acrylic Acid on PEG) | 3000 |
| Example VII (Grafted Polymer of Preformed Acrylic Acid on Polyethylene Oxide) | 2812 |
| Example VI (Non-grafted | 1875 |

TABLE 1-continued

| Material | Chelation Value (C.V.) C.V. (Gram CaCO$_3$/ gram of Product) |
|---|---|
| Polyacrylate/polyethylene Oxide Blend) Polyacrylate Homopolymer (M.W. = 7,200) | 1750 |
| Product of Knopf et al, U.S. Pat. No. 4,528,334 | 0 |

Example VIII

Into a 2 liter reaction vessel equipped with a thermometer, nitrogen purge, heating mantle, reflux condensers, and an overhead stirrer was placed 1,074.0 grams (0.2148 moles) of a 5,000 molecular weight polyethylene oxide polymer. The polymer was melted under a nitrogen sparge at a temperature of 80°. Heating was continued at 100° C. and 126.0 grams (1.65 moles) of propylene glycol were added to the polymer. Stirring was continued and 288.0 grams (4.09 moles) of glacial acrylic acid, 16.9 grams (0.16 moles) of mercaptopropionic acid and 3.12 grams (0.016 moles) of tertiary butyl perbenzoate were added slowly to the polymer over a 3-hour period. After the completion of the additions, 31 grams (0.32 mole) of a 35 wt-% aqueous hydrogen peroxide solution were slowly added over a 10-minute period. At the end of the addition a white, thick product was obtained.

The compositions of this invention were tested in a dishwasher for spot and film performance. The test was used under stressed conditions, i.e. conditions of extra heavy soil and light detergent in order to help differentiate between sheeting and spotting properties of different formulas. The test is performed by running four clear drinking glasses through four complete cycles of a KITCHENAID ® dishwasher with 12.5 grams of ELECTRASOL ® (automatic dishwashing detergent) powder and 100 grams of "Hot Point Soil" (4:1 weight/weight margarine/powdered milk). The water used is 220 ppm hardness as calcium carbonate and the temperature is 130° F. The resulting clean glasses were rated on a scale of 0-8, where 8 is worst, by 10 trained panelists. The glasses were graded in a dark room with black lighting. Three tests results are shown in FIG. 1: a control run with no rinse aid; a test (Formula 1) run using conventional JET DRY ®; and a test (Formula 2) run using JET DRY ® with a sample of the composition of the invention. The results of the experiment as shown in FIG. 1 indicate that the sample using the grafted polyacrylic copolymer has the best spot and film properties.

The compositions of the invention were also tested in an alternative testing format for sheeting ability. In this test an assembly of glass plates were dipped in a solution of the rinse additive (100 ppm active), removed from the solution and left to drain over time while recording weight changes of the assembly. An index was defined by adding the weights found at various times. This provided a measure of rinsing properties. The results of the experiment are shown in FIG. 2, wherein line 1 is a 5,000 molecular weight polyethylene oxide polymer, line 2 is a blend of a polyacrylate polymer and a polyethylene glycol polymer at a 1 to 5 weight ratio, and line 3 is a graft copolymer of the invention having 1 part by weight of polyacrylate and 5 parts by weight of the polyethylene glycol as starting material. The graft copolymer has significantly improved sheeting properties.

The water treatment agents of the invention can be used in conjunction with active detergent substances in detersive systems. The detersive system typically contains soil removing detergents and a dispersed but active amount of the water treatment agents of this invention. Detersive systems are most commonly used in cleaning hard surfaces such as sinks, tiles, windows and other glass, ceramic, plastic or other surface dishware, laundry and other textiles. Soils removed from such substrates are extremely variable in composition and it is well within the skill of the art to combine detersive components to provide mixtures that can remove proteinaceous carbohydrates, fatty or inorganic/organic components from soiled surfaces. Typically detersive systems are used in a bath, commonly an aqueous based bath. The components dissolved or suspended in the water tend to alter the interface between the soil and water to permit removal of the soil from the surface. Materials which can be used independently in detersive systems include the following: (a) surfactants including various synthetic surfactants and natural soaps, (b) inorganic builders, diluents, or fillers including acid salts and bases, (c) organic builder additives which enhance detergency, foaming power, emulsifying power, soil suspension, (d) special purpose additives such as bleaching agents, spreading agents, enzyme bactericides, anti-corrosion agents, emollients, dyes, fragrances, etc., and (e) hydrotrope solubilizers used to ensure the compatibility of the mixture of components when placed in aqueous solution.

Typical detersive systems can contain from about 1 to 95 wt-% of the detergent material, preferably 1.5 to 50 wt-%, and most preferably 2 to 10% of the detergent in combination with 0.1-40 wt-%, preferably 0.5-30%, and most preferably 2-30%, of the detersive system, the balance being water.

The inherent properties of the graft copolymers of the invention include the ability to sequester, chelate hardness components or inhibit crystal growth of metal ion carbonate and bicarbonate. Such properties enable the skilled artisan to use the graft copolymers of the invention to soften water. The water softening effect can be used in blended detersive systems as shown above or in bulk phase to soften an aqueous stream.

The specification and Examples above are presented to aid in the complete nonlimiting understanding of the invention. Since many variations and embodiments of the invention can be made without departing from the spirit and scope of the invention, the invention resides in the claims hereinafter appended.

We claim:

1. A polymeric, water treating composition comprising a graft block copolymer with a chelation value above about 1875, the graft block copolymer having 10 to 50 wt-% of a backbone polymer having repeating units derived from an alpha, beta unsaturated carboxylic acid monomer, the carboxylic acid selected from the group consisting of acrylic acid, methacrylic acid, itaconic acid, or mixtures thereof, and grafted thereon 50 to 90 wt-% of polymeric moieties having repeating units derived from an alkylene oxide, said grafted moieties terminating in a hydroxyl group the polymer having been prepared by reacting the components at a temperature of about ambient to about 100° C.

2. The polymer of claim 1 wherein each polymeric moiety has the formula $A[(OC_nH_{2n})_mOR]_a$, wherein A is hydrogen or a hydrocarbon radical containing 1 to 10 carbons, R is a hydrogen or a monovalent hydrocarbon radical containing 1 to 6 carbon atoms, m is an integer of about 5 to 1,000, and a and n are independently an integer of about 1 to 5.

3. The polymer of claim 1 wherein the alpha, beta unsaturated carboxylic acid is acrylic acid.

4. The polymer of claim 1 wherein the graft copolymer is formed by grafting preformed polymer moieties.

5. The polymer of claim 3 wherein the molecular weight of the backbone is about 2,500 to 25,000.

6. The polymer of claim 1 wherein there are at least 3 graft polymer moieties formed on the backbone.

7. The polymer of claim 1 wherein the polyalkylene oxide has a molecular weight of about 100 to 10,000.

8. The graft polymer of claim 5 wherein the backbone comprises a homopolymer and has a molecular weight of about 4,000 to 8,000.

9. The polymer of claim 1 wherein the polymeric moiety is formed from a mixture of ethylene oxide and propylene oxide.

10. The polymer of claim 1 wherein the backbone is formed from a mixture of alpha, beta unsaturated carboxylic acids.

11. A method for preparing a graft copolymer with a chelation value above about 1875, the graft block copolymer of 10 to 50 wt-% of an alpha, beta unsaturated mono-carboxylic acid and 50 to 90 wt-% of a polyalkylene oxide polymer which comprises reacting, at a temperature of about ambient to about 110° C., a polyalkylene oxide polymer and a graft reactant, selected from the group consisting of an alpha, beta unsaturated carboxylic acid monomer, the carboxylic acid selected from the group consisting of acrylic acid, methacrylic acid, itaconic acid, or mixtures thereof, and a preformed polymer comprising repeating units derived from an alpha, beta unsaturated carboxylic acid, in the presence of a free radical graft polymerization catalyst.

12. The method of claim 11 wherein the reaction is carried out in the presence of about 6 to 10 parts by weight of a $C_{1-6}$ mono, di or trihydroxy alcohol composition.

13. The method of claim 11 wherein the polyalkylene oxide polymer has the formula $A[(OC_nH_{2n})_mOR]_a$, wherein A is hydrogen or a hydrocarbon radical containing 1 to 10 carbons, R is a hydrogen or a monovalent hydrocarbon radical containing 1 to 6 carbon atoms, m is an integer of about 5 to 1,000, and a and n are independently an integer of about 1 to 5.

14. The method of claim 11 wherein the alpha, beta unsaturated carboxylic acid is acrylic acid.

15. The method of claim 11 wherein the graft reactant is a preferred polyacrylic acid homopolymer.

16. The method of claim 15 wherein the molecular weight of the homopolymer is about 2,500 to 25,500.

17. The method of claim 11 wherein there are at least 3 graft polymer moieties formed on the backbone.

18. The method of claim 11 wherein the polyalkylene oxide polymer is a polyethylene oxide having a molecular weight of about 100 to 10,000.

19. The method of claim 11 wherein the polyalkylene oxide backbone is formed from a mixture of ethylene oxide and propylene oxide.

20. The method of claim 11 wherein the graft reactant preformed polymer is formed from a mixture of alpha, beta unsaturated carboxylic acids.

21. A detersive system capable of removing soils from surfaces which comprise a major proportion of a detergent and an effective hardness sequestering amount of the graft copolymer of claim 1.

22. The detersive system of claim 21 wherein the detergent is an inorganic detergent selected from the group consisting of sodium hydroxide, sodium silicate, sodium carbonate, and mixtures thereof.

23. The detersive system of claim 21 wherein the detergent is an organic synthetic surfactant.

24. A method of treating water by chelating or sequestering hardness components of service water comprising contacting service water with an effective amount of the composition of claim 1 to chelate the hardness components of the surface water, removing the hardness components from effective aqueous solution.

25. A solid rinse aid composition comprising:
(a) about 30 to 90 wt-% of the polymeric graft copolymer of claim 1;
(b) about 5 to 60 wt-% of a nonionic surfactant;
(c) about 5 to 40 wt-% of an organic water insoluble composition, selected from the group consisting of microcrystalline waxes, ethylene-acrylic copolymers, alkyl alkanol amides, or mixtures thereof;
said percentages based on the total composition.

26. The rinse aid of claim 25 wherein the nonionic surfactant is selected from the group consisting of polyoxyalkylene oxide block copolymers, alkoxylated alkyl phenols, alkoxylated aliphatic alcohols, lecithin and mixtures thereof.

27. The rinse aid of claim 25 wherein the organic water insoluble composition comprises a solubility reducing agent selected from the group consisting of microcrystalline waxes, ethylene-acrylic acid copolymers, alkyl alkanol amides, and mixtures thereof.

28. The rinse aid of claim 25 wherein the rinse aid additionally comprises a defoaming surfactant.

29. The rinse aid of claim 28 wherein the defoaming surfactant is selected from the group consisting of phosphate esters, natural or synthetic waxes, silicones, fatty acids, hydrophobic silica, and mixtures thereof.

30. The polymeric water treating composition of claim 1 wherein the composition is water soluble.

31. The method of claim 11 wherein the graft polymer is water soluble.

* * * * *